US009807976B2

(12) United States Patent
Taylor et al.

(10) Patent No.: US 9,807,976 B2
(45) Date of Patent: Nov. 7, 2017

(54) CLOSEABLE CONTAINER CAP

(71) Applicant: PROCESS4, INC., Chagrin Falls, OH (US)

(72) Inventors: Curtis Taylor, Chagrin Falls, OH (US); Matthew Hanson, Chagrin Falls, OH (US); David Hudak, Solon, OH (US)

(73) Assignee: Process4, Inc., Chagrin Falls, OH (US)

( * ) Notice: Subject to any disclaimer, the term of this patent is extended or adjusted under 35 U.S.C. 154(b) by 36 days.

(21) Appl. No.: 15/010,515

(22) Filed: Jan. 29, 2016

(65) Prior Publication Data

US 2016/0229602 A1    Aug. 11, 2016

Related U.S. Application Data

(60) Provisional application No. 62/112,944, filed on Feb. 6, 2015.

(51) Int. Cl.
| | | |
|---|---|---|
| *B65D 47/00* | (2006.01) | |
| *B67D 3/00* | (2006.01) | |
| *A01K 1/01* | (2006.01) | |
| *B07B 1/02* | (2006.01) | |
| *A01K 23/00* | (2006.01) | |
| *E01H 1/12* | (2006.01) | |
| *B65D 51/18* | (2006.01) | |

(52) U.S. Cl.
CPC .......... *A01K 1/0114* (2013.01); *A01K 23/005* (2013.01); *B07B 1/02* (2013.01); *B65D 51/18* (2013.01); *E01H 1/1206* (2013.01); *B65D 2547/06* (2013.01)

(58) Field of Classification Search
CPC ............... B65D 51/18; B65D 2547/06; B65D 2547/066; B65D 47/065; B65D 47/305; B65D 47/265; B65D 47/261
USPC ....... 222/554, 553, 505, 507, 510, 362, 444, 222/452; 220/253
See application file for complete search history.

(56) References Cited

U.S. PATENT DOCUMENTS

| | | | | |
|---|---|---|---|---|
| 755,299 | A * | 3/1904 | Kent ................... | B65D 47/263 222/553 |
| 1,961,173 | A * | 6/1934 | Schutte ................. | B65D 47/30 222/368 |
| 2,533,915 | A * | 12/1950 | Brooks ................. | B65D 47/265 215/313 |
| 4,141,476 | A * | 2/1979 | Rech ...................... | B65D 47/30 222/505 |
| 4,493,438 | A * | 1/1985 | Rutter .................. | B65D 77/067 222/153.09 |
| 4,516,691 | A * | 5/1985 | Christine .................. | B67B 7/26 222/522 |
| 5,111,970 | A * | 5/1992 | Rutter .................... | B67D 3/047 222/105 |
| 5,123,574 | A * | 6/1992 | Poulos ............... | B65D 83/0409 215/253 |
| 5,303,850 | A * | 4/1994 | Connan ................ | B65D 47/263 215/253 |
| 6,848,602 | B2 * | 2/2005 | deCler .................. | B67D 3/045 222/105 |

(Continued)

*Primary Examiner* — Benjamin R Shaw
(74) *Attorney, Agent, or Firm* — Fay Sharpe LLP

(57) ABSTRACT

A closeable container cap device that is adapted to releasably connect to litter containers such that when the closeable container cap is screwed on to the litter container opening, the closeable container cap allows for the controllable dispensing of litter from litter container.

24 Claims, 7 Drawing Sheets

(56) References Cited

U.S. PATENT DOCUMENTS

2004/0256421 A1\* 12/2004 Werth ................. B65D 47/265
 222/480

\* cited by examiner

CLOSEABLE CONTAINER CAP

CROSS-REFERENCE TO RELATED APPLICATIONS

This application claims priority to U.S. Provisional Patent Application Ser. No. 62/112,944, filed Feb. 6, 2015. The entirety of that application is hereby fully incorporated by reference.

The present invention is directed to a container cap, particularly to a container cap having a dispensing feature, and more particularly to a container cap that, when attached to a container, can provide controlled amounts of product to be dispensed, and will be described with particular reference thereto. However, it is to be appreciated that the present exemplary embodiment is also amenable to other like applications.

BACKGROUND ON THE INVENTION

Multiple use container systems have been utilized in order to facilitate the storage and transport of a variety of materials. Often, the container is used as the primary means for containing the material such that the material is sealed within the container by said container cap. These materials may include solid goods (e.g., cat litter, pet food, powder detergent, etc.) and fluid goods (e.g., laundry detergent, etc.) and may come in a variety of dimensions.

As the volume and/or weight of such containers become increasingly larger, it becomes a burden on the handler to lift or otherwise controllably dispense the contents from the container. It would be desirable to provide a closeable container cap that allows for controlled dispensing of goods from a container.

In view of the prior art, there remains a need for a closeable container cap that can easily and conveniently be attached to a container and used as a dispenser, and which cap can be used to easily and conveniently control the dispensing of goods from the container.

SUMMARY OF THE INVENTION

The present invention is directed to a container cap having a dispensing feature that, when attached to a container, can control the amount and/or dispensement rate of product being dispensed from the container. The container cap of the present invention can be configured to be removable from the container; however, this is not required. The container cap of the present invention is configured to prevent the dispensement of product from the container when the container cap is in the closed position; however, this is not required. The container cap of the present invention can be configured for use with containers designed for pet litter and will be described with particular reference thereto; however, it can be appreciated that the container cap of the present invention can be attached to other types of containers (e.g., laundry detergent containers, etc.) for the purpose of dispensing other products.

Generally, storage containers comprise a screw cap which is unscrewed or removed from the container to provide access to the container's contents. Once the cap is removed from the container, the contents of the container can be poured out or otherwise dispensed from the container. The neck of such a container is usually a substantially uniform cylindrical member having a first end supported on one side of the container about a generally circular opening formed therein. The neck can include an open second end opposite the first end, which in conjunction with the first end, can define a central passage between the ends and in communication with the interior of the container through the opening. The central passage is defined by the interior cylindrical wall of the neck. The neck can also include an outer wall which can be externally screw-threaded so as to accommodate an internally threaded screw cap for closing the passage and sealing the interior of the container; however, this is not required. As can be appreciated, the container can have many different types and shapes of openings.

In accordance with one non-limiting embodiment of the present invention, there is provided a closeable container cap suitable for use with storage containers. The closeable container cap can be designed to releasably connect to an opening in a container; however, this is not required. As can be appreciated, the container cap can be permanently connected to the container. The container cap is configured to provide a means of controllably dispensing a product from the container.

In accordance with another and/or alternative non-limiting embodiment of the present invention, there is provided a closeable container cap which can include a housing portion, a dispensing lip, and a rotatable top portion. The material of the housing portion, the dispensing lip, and the rotatable top portion of the closeable container cap can be the same; however, this is not required. As can be appreciated, the material of at least one of the housing portion, the dispensing portion, and the rotatable top portion can be different from one or more other components of the container cap. In one non-limiting embodiment, the material of the one or more components of the closeable container cap can be a high-density polyethylene (HDPE) plastic, a low-density polyethylene (LDPE) plastic, a rubber material, polyvinyl chloride (PVC), various types of resins, various types of resin epoxides, polyester, polypropylene, polyurethane, polyacrylate, and copolymers thereof, etc. In another non-limiting embodiment, the material of the one or more components of the closeable container cap can be a silicone rubber or similar material having sufficient flexibility to prevent breakage of the container contents; however, this is not required. As can be appreciated, the closeable container cap of the present invention can be formed from other or additional materials (e.g., metal, wood, composite materials, ceramic, etc.).

According to one non-limiting embodiment of the present invention, the closeable container cap of the present invention is sealingly engaged to a container; however, this is not required. As such, the amount of material leaking from the closeable container cap is reduced or eliminated. The closeable container cap can be sealingly engaged to the container by a housing portion disposed on the closeable container cap and a corresponding receiver disposed on an opening of a container (i.e., screw threads on the neck of a container).

In accordance with another and/or alternative non-limiting embodiment of the present invention, the closeable container cap includes a housing portion which can provide a means of attachment of the closeable container cap to a container. The housing portion of the closeable container cap can allow for a releasable connection between the closeable container cap and container; however, this is not required. In one non-limiting arrangement, the housing portion can be configured to be screwed on and screwed off of a container opening; however, other connection arrangements can be used. As such, the housing portion of the closeable container cap can be releasably connected to a container thereby covering the central passage of the container as defined by the wall of the neck of the container. The coupling end of the housing portion of the container cap can have an inner diameter larger than the outer diameter of the container opening and can be configured to cover the container opening; however, this is not required. The housing portion of the container cap and the corresponding receiving portion on the neck of the container can be a threaded combination wherein the combination is arranged such that the housing portion and receiving portion can include interlocking correspondingly disposed threads helically disposed on the inner surface of the housing portion and on the outer surface of the container neck; however, this is not required (e.g., the housing portion can be threads and the receiver portion can be corresponding threads). As such, the housing portion can be provided with threads in any suitable location such that the threads can be operatively engaged with the threads on the container neck; however, this is not required. As can be appreciated, other connection arrangements can be used.

In accordance with another and/or alternative non-limiting embodiment of the present invention, a gasket and/or sealing element can be provided between the housing portion and neck of the container or between the rotatable top portion and neck of the container for the purpose of eliminating leaks from the connection between the closeable container cap and container. The gasket and/or sealing element can be disposed around an inner diameter of the housing portion wherein, in the radial direction, the gasket extends at least 1 mm beyond a perimeter of the containers opening edge; however, this is not required. The housing portion and the gasket and/or sealing element can be two separate parts; however, this is not required. As can be appreciated, the housing portion can include a sealing material provided thereon such that when the housing portion is engaged with the top edge of the container opening, a seal is provided and wherein the seal is leak-proof. The housing portion and the gasket and/or sealing element can be made of two different materials; however, this is not required. The material of the gasket and/or sealing element is non-limiting.

In accordance with another and/or alternative non-limiting embodiment of the present invention, the shape of the housing portion can be cylindrical with a hollow core. The housing portion is designed to extend at least partially over the length of the neck of the container. In one non-limiting embodiment, the length of the housing portion can be about equal to the length of the container neck; however, this is not required. In other or alternative non-limiting embodiments, the length of the housing portion is less than or greater than the length of the container neck. The dimensions of the housing portion can be adapted to the type of product to be dispensed therethrough. In some embodiments, the internal diameter of the housing portion is within the range of about 0.25 in to about 2 in, and more particularly is within the range of about 0.5 in to about 1.5 in, and in one such embodiment, the internal diameter of the housing portion is about 1.0 in. In some embodiments, the thickness of the housing portion material is within the range of about 1 mm to about 2 mm, and in one such embodiment, the thickness is about 1.5 mm. However, it can be appreciated that other diameter and thickness dimensions may be used.

In accordance with another and/or alternative non-limiting embodiment of the present invention, one or more apertures can be provided in the housing portion of the closeable container cap. The shape of the apertures in the housing portion can be circular, elliptical, square, rectangular, trapezoidal, etc. As can be appreciated, other aperture shapes can be used. The length and width of the apertures can be about 5 mm in diameter when the circular shape is used; however, this is not required. As can be appreciated, the length and width of the apertures can be greater than 5 mm or less than 5 mm, and can be optimized based on the contents of the container. In another non-limiting arrangement, the opening can have a greater width than the height. In one non-limiting configuration, the ratio of the width to the height of the opening is 1.1-6:1 and any value or range therebetween.

In accordance with another and/or alternative non-limiting embodiment of the present invention, there is provided a retaining arrangement to inhibit or prevent the rotatable top portion of the container cap to separate from the housing when the rotatable top portion is moved between the open and closed positions. The configuration of the retaining arrangement is non-limiting. For example, the retaining arrangement can include a rib and slot arrangement, a pin and slot arrangement, a tongue and groove arrangement, etc. The retaining arrangement can be also configured to limit the range or degree of movement of the rotatable top portion relative to the housing; however, this is not required. The retaining arrangement can optionally include a biasing arrangement that is configured to bias the rotatable top portion in the closed position. One non-limiting biasing arrangement includes a spring; however, other or additional biasing arrangements can be used. The rotatable top portion of the closeable container cap, according to one non-limiting embodiment of the present invention, can provide the closeable container cap with a dispensing and/or actuating mechanism for the purpose of controllably dispensing contents from a container.

In accordance with another and/or alternative non-limiting embodiment of the present invention, the shape of the rotatable top portion can be cylindrical with one end closed and one end open; however, this is not required. The rotatable top portion can comprise a shaft/drum portion and a handle portion, wherein the shaft portion can be inserted at least partially into the housing portion however, this is not required. As such, the diameter of rotatable top portion can be less than the diameter of the housing portion; however, this is not required. The handle portion can be attached to the drum portion such that when the handle is rotated clockwise or counterclockwise, the drum portion is also rotated in the same direction. As such, the handle portion can be used to move the rotatable top portion between the open and closed positions.

In accordance with another and/or alternative non-limiting embodiment of the present invention, one or more apertures may be provided on the shaft/drum portion of the rotatable top portion of the closeable container cap; however, this is not required. The shape of said apertures in the hollow cylindrical drum portion can be circular, elliptical, square, rectangular, trapezoidal, etc. As can be appreciated, other aperture shapes can be used. The length and width of said apertures can be about 5 mm in diameter when the circular shape is used; however, this is not required. As can be appreciated, the length and width of the apertures can be greater than 5 mm or less than 5 mm, and can be optimized based on the contents of the container. The one or more apertures disposed on the rotatable top portion can be designed to match and/or communicate with corresponding one or more apertures disposed on the housing portion of the closeable container cap such that when at least one or more apertures between the rotatable top portion and the housing portion are aligned, a flow path is created for product leaving a container; however, this is not required. As can be appreciated, other arrangements can be used.

In accordance with another and/or alternative non-limiting embodiment of the present invention, the handle on the rotatable top portion can be configured to rotate such that when the handle portion rotates, the shaft/drum member of the rotatable top portion also rotates such that the one or more apertures on the drum member form a connection and/or passageway with the one or more apertures disposed on the housing portion of the closeable container cap; however, this is not required. In this way, the contents of the container can have communication and controllably flow through the closeable container cap device.

In accordance with another and/or alternative non-limiting embodiment of the present invention, the handle on the top portion can be configured to be pulled outwardly from the housing portion such that when the handle portion is pulled out, the shaft/drum member is also pulled out such that, once pulled out, the one or more apertures on the drum member form a connection and/or passageway with the one or more apertures disposed on the housing portion of the closeable container cap; however, this is not required. In this way, the contents of the container can have communication and flow through the closeable container cap.

In accordance with another and/or alternative non-limiting embodiment of the present invention, the handle on the top portion can be pushed inwardly into the housing portion such that when the handle portion is pushed in, the shaft/drum member is also pushed in such that, once pushed in, the one or more apertures on the drum member form a connection and/or passageway with the one or more apertures disposed on the housing portion of the closeable container cap; however, this is not required. In this way, the contents of the container can have communication and flow through the closeable container cap.

In accordance with another and/or alternative non-limiting embodiment of the present invention, the housing portion does not contain any apertures. Thus, when in use, the handle on the top portion can be pulled outwardly or pushed inwardly relative to the housing portion such that when the handle portion is pulled out or pushed in, the shaft/drum member is also pulled out or pushed in such that, when in a pulled out position or pushed in position, the one or more apertures on the drum member are no longer blocked off by the aperture-free housing portion of the closeable container cap. In this way, the contents of the container can have communication and flow through the closeable container cap.

In accordance with another and/or alternative non-limiting embodiment of the present invention, the closeable container cap can optionally include a dispensing lip portion which is designed to allow the contents of the container to flow from the closeable container cap. The dispensing lip portion of the closeable container cap can be continuous with the housing portion of the closeable container cap; however, this is not required. As can be appreciated, the dispensing lip portion and the housing portion can be two distinct components of the closeable container cap. The dispensing lip portion can be designed to be detachable from the housing portion; however, this is not required. The dispensing lip portion can be substantially cylindrical in shape; however, this is not required. The first end of the dispensing lip portion can be supported by the container and can optionally be continuous therewith. The dispensing lip portion can include an open second end opposite the first end, which in conjunction with the first end, can define a central passage between the first end and second end and in communication with the interior of the housing portion of the closeable container cap. The central passage therethrough is defined by the interior cylindrical wall of the dispensing lip portion. However, as can be appreciated, the dispensing lip of the present invention can comprise other shapes (e.g., rectangular, trapezoidal, etc.). The open first end of the dispensing lip portion can be designed to match the aperture disposed on the housing portion; however, this is not required. The cross-sectional shape and/or size of the opening in the dispensing lip can be constant or vary along the longitudinal length of the dispensing lip. The passageway in the dispensing lip can at least partially or continuously angle upwardly or downwardly from the housing; however, this is not required. The dispensing lip of the closeable container cap can comprise a wide mouth portion attached to the housing portion of the closeable container cap, a central tapering section defining the central passageway through the dispensing lip portion, and a lower portion having an open lower end, providing a dispensing aperture and thereby providing a substantially funnel-like arrangement; however, this is not required. The dispensing lip of the closeable container cap can comprise a substantially oval cylindrical shape; however, this is not required. As such, the top edge can be shorter than the bottom edge; however, this is not required. As can be appreciated, other dimensions and/or arrangements can be used.

Generally, in use, the receiving end of the housing portion of the closeable container cap is positioned facing towards the container and oriented in a position to receive the neck portion of a litter container such that product can pass from the container through the lower end of the housing portion, into the housing portion, and through the rotatable top portion. The handle on the rotatable top portion may be turned so as to rotate the rotatable member such that the rotation causes alignment of the rotatable top portion aperture with the housing portion aperture. Alternatively, the handle on the top portion may be pulled outwardly or pushed inwardly relative to the container such that the pushing in or pulling out of the top portion causes alignment of the top portion aperture with the housing portion aperture. In this way, the contents of the litter container can be controllably released from said container and into a secondary receptacle (e.g., cup, bowl, litter box, etc.) positioned below the dispensing aperture of the dispensing lip portion of the closeable container cap.

In accordance with another and/or alternative non-limiting embodiment of the present invention, a portion or all of the top portion and/or the housing portion can be formed of a clear or semi-clear material to enable a user to visually see if material properly flowing through the closeable container cap when the closeable container cap is the partially or fully open position; however, this is not required.

A general method using the closeable container cap of the present invention used in conjunction with a cat litter container can be performed by the following steps: obtaining a cat litter container; positioning said container in a vertical orientation such that the opening of said container is facing upwardly; screwing the closeable container cap on to the cat litter container; positioning the container in a horizontal orientation such that the opening of the container is in a vertical orientation; actuating the actuating means so as to move the closeable container cap from its closed position to its open position; dispensing the cat litter from the cat litter container; collecting the contents of the cat litter container in a secondary receptacle (e.g., cup, bowl, cat litter box, etc.); actuating the actuating means in the opposite direction so as to move the closeable container cap from its open position to its closed position; and returning the cat litter container to it's original, vertical position.

These and other objects, features, and advantages of the present invention will become apparent from the subsequent description taken in conjunction with the accompanying drawings.

BRIEF DESCRIPTION OF THE DRAWINGS

Reference may now be made to the drawings, which illustrate various non-limiting embodiments that the present invention may take in physical form and in certain parts and arrangement of parts wherein.

DETAILED DESCRIPTION OF NON-LIMITING EMBODIMENTS

Figure 1:
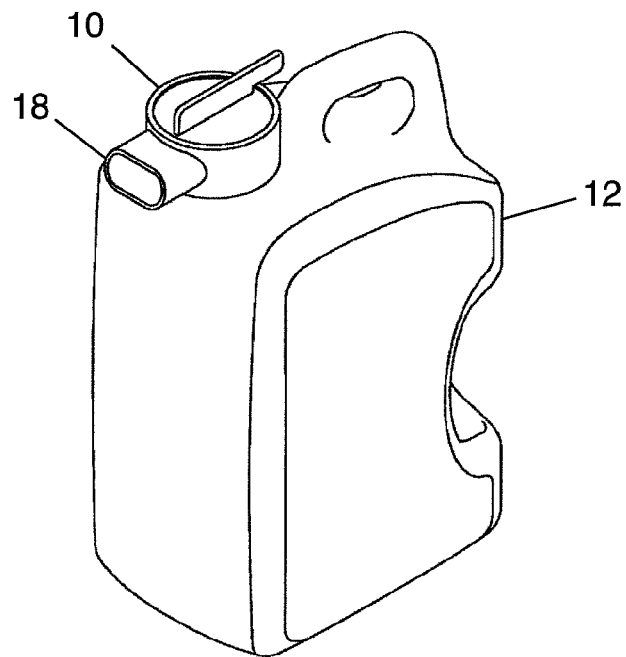
FIG. 1 is a perspective view of a closeable container cap attached to a container according to one non-limiting aspect of the present invention.

Referring now to the drawings, wherein the showing is for the purpose of illustrating non-limiting embodiments of the invention only and not for the purpose of limiting the same, FIGS. 1-13 illustrate non-limiting embodiments of a closeable container cap in accordance with the present invention.

An exemplary non-limiting embodiment of the present invention includes a closeable container cap suitable for use in the controllable dispensing of cat litter from a litter container. Although the closeable container cap of the present invention disclosed herein is particularly described as used with a container of pet litter, it will be appreciated that the closeable container cap can also be used for the dispensing of other products (e.g., laundry detergent, epsom salt, laundry boosters, etc.).

Referring now to FIGS. 1-8, the closeable container cap 10 can be attached to a litter container 12; however, this is not required. As can be appreciated, closeable container cap 10 can be configured and/or adapted to fit other types of containers. In non-limiting embodiments, closeable container cap 10 can be designed to be releasably connected to the opening 11 of container 12; however, this is not required. The releasable connection between closeable container cap 10 and container 12 can be designed to be air-tight and/or liquid-tight; however, this is not required.

Closeable container cap 10 can be designed to be screwed on to and/or off of container 12; however, other connection arrangements can be used.

Closeable container cap 10 can be designed to function as a valve for manually controlling the dispensing of product from container 12.

Figure 2:
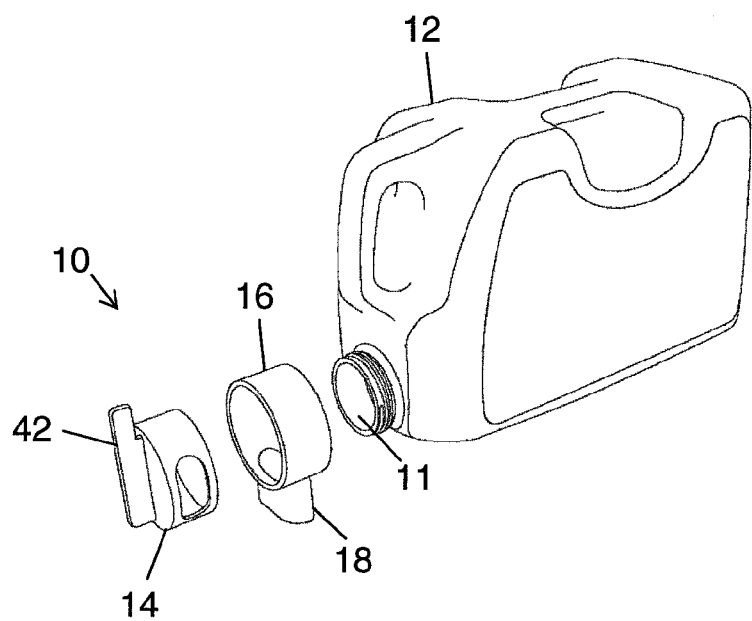
FIG. 2 is an exploded view of the container cap of FIG. 1.

FIG. 2 is an exploded view of closeable container cap 10. The closeable container cap comprises a plurality of components, namely a housing portion 16 and a rotatable top portion 14. Housing portion 16 can be designed to be screwed on or otherwise be connected to container 12 to cover open 11 of the container. The housing portion can be releasably or nonreleasably connected to the container. Rotatable top portion 14 can be designed to enable closeable container cap 10 to be positioned in the open and closed positions. An optional dispensing lip 18 on the housing portion can be designed to allow the product in container 12 to flow from the closable container cap via optional dispensing lip 18 to facilitate in the controlled dispensing of material from the container. Rotatable top portion 14 can be used to optionally control the flow rate of the product flowing form the dispensing lip 18 of closeable container cap 10; however, this is not required.

Figure 3:
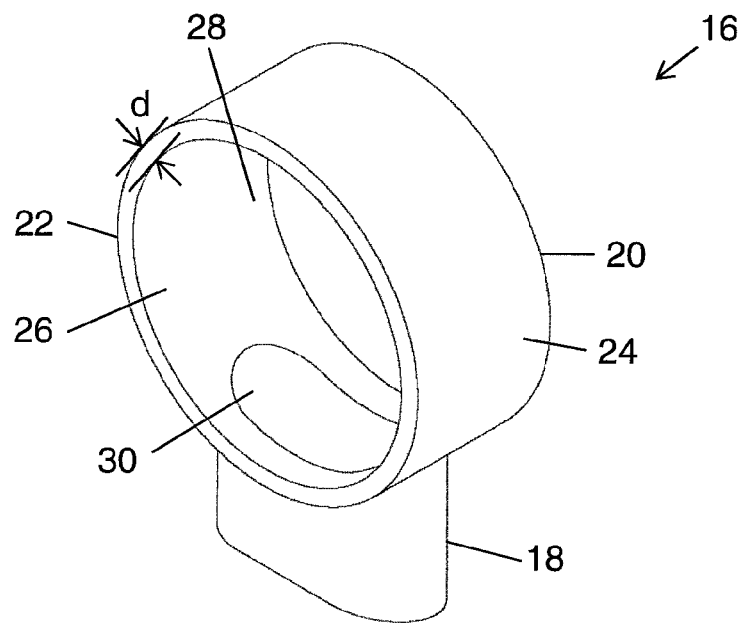
FIG. 3 is a perspective view of a closeable container cap housing portion.

The dispensing lip portion 18 can be provided for the purpose of directing the flow of product; however, this is not required. The shape and dimensions of dispensing lip portion 18 are non-limiting; however, the shape and dimensions can be selected to optimize the flow of product from the container. In one non-limiting arrangement, the internal cavity of the dispensing lip has the same size and shape of aperture 30 in the housing portion 16 as illustrated in FIG. 3. The dispensing lip (when used) can be designed to maintain its shape and size along the complete length of the internal cavity of the dispensing lip; however, this is not required. The length of the internal cavity of the dispensing lip is generally about 0.5-4 inches; however, other lengths can be used. The central axis of the internal cavity is generally perpendicular to the central axis of cavity 28 of housing portion 16; however, this is not required. As illustrated in FIG. 3, aperture 30 is spaced above the coupling edge 20 of housing portion 16 and also spaced below the top edge 22 of housing portion 16. One or more apertures can optionally be included in housing portion 16. The width of aperture 30 is illustrated as being greater than a height of the aperture; however, this is not required. As can be appreciated, the shape of aperture 30 is non-limiting (e.g., oval, circular, square, rectangular, elliptical, oblong, etc.). Aperture 30 (when used) can be oriented in a position equidistant from the coupling edge and the top edge, and extends only partially the circumference of the housing portion 16. The dispensing lip and the housing portion are illustrated as being formed from a single piece of material; however, this is not required.

Figure 5:
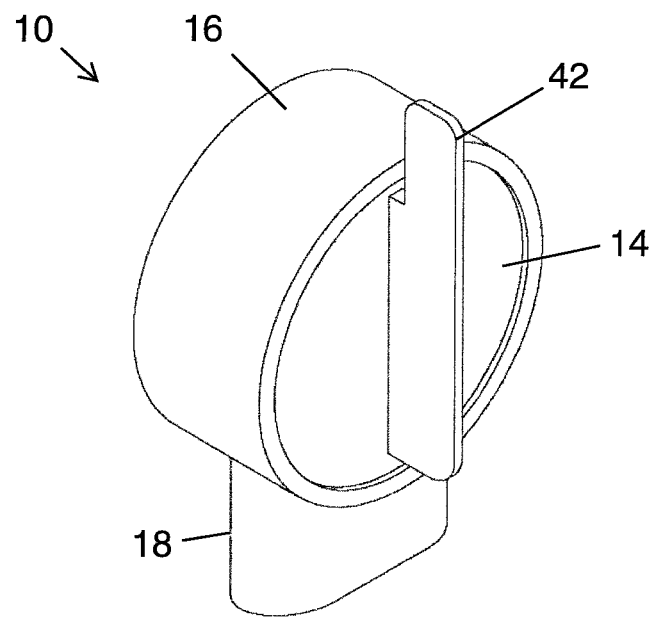
FIG. 5 is a perspective view of the closeable container cap of FIG. 1 in a closed position.
Figure 6:
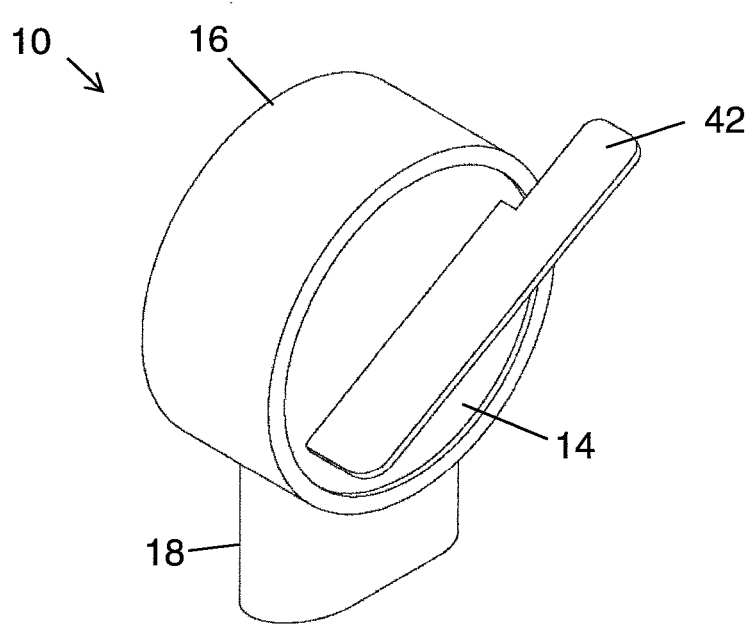
FIG. 6 is a perspective view of the closeable container cap of FIG. 1 in an open position.

As best seen in FIG. 3, housing portion 16 optionally has a substantially smooth and generally cylindrical elongate shape (when not including the optional dispensing lip), and establishes the housing portion's coupling edge 20, top edge 22, inner surface 26 and outer surface 24. Coupling edge 20 of closeable container cap 10 is defined as the edge of housing portion 10 which faces towards the container when attached to the container. Top edge 22 of housing portion 10 is defined as the edge which faces away from the container and partially or fully encircles cavity 28 that is designed to receive rotatable top portion 14 as illustrated in FIG. 5 and FIG. 6.

In non-limiting embodiments, threads (not shown) can be disposed on the inner surface 26 of housing portion 16 such that the housing portion can be releasably attached to a container; however, this is not required.

In one non-limiting embodiment, the material of housing portion 16 is blow-molded polyethylene; however, this is not required. As can be appreciated, the housing portion can be formed of other or alternative materials.

Housing portion 16 has a generally hollow cylindrical shape with an open first end and an open second end; however, this is not required. In one non-limiting embodiment, the dimensions of a housing portion are about 1-3 inches in height by about 1-4 inches in diameter. However, it can be appreciated that the housing portion can have many other types of shapes and dimensions. The thickness d of the material of housing portion 16 can be about 1-10 mm; however, this is not required.

Optionally, the outer surface 24 of housing portion 16 can be textured with a plurality of slip-resistant surface projections for the purpose of improving grip when wet. The textured pattern on the outer surface of the housing portion is non-limiting.

Figure 4:
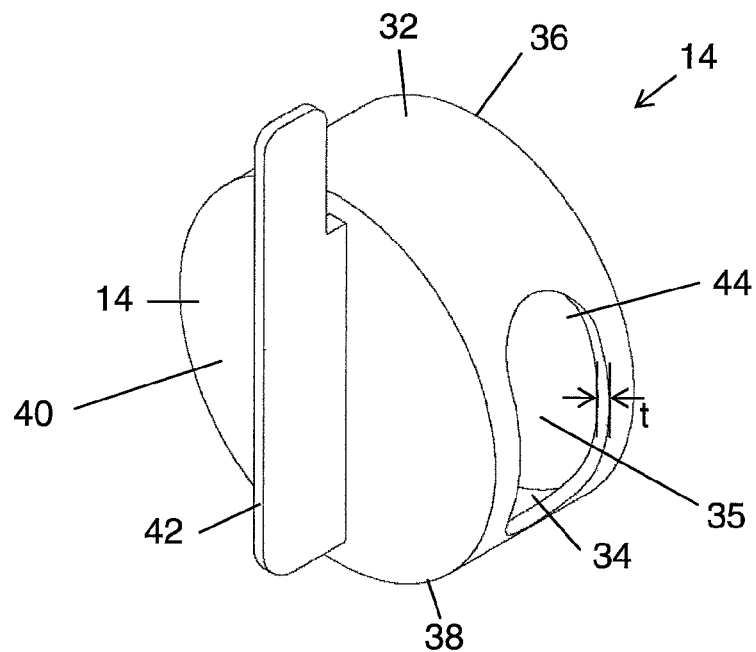
FIG. 4 is a perspective view of a closeable container cap rotatable top portion.

FIG. 4 is a perspective illustration of rotatable top portion 14. Rotatable top portion 14 optionally has a substantially cylindrical shape and establishes the rotatable top portion's coupling edge 36, top edge 38, inner surface 34, and outer surface 32. Coupling edge 36 is defined as the edge of rotatable top portion 14 which approaches the container when closeable container cap 10 is attached to the container; however, this is not required.

The material of rotatable top portion 14 can be the same as the material of housing portion 16; however, this is not required. In one non-limiting embodiment, the material of rotatable top portion 14 is blow-molded polyethylene; however, this is not required. As can be appreciated, the rotatable top portion can be formed of other or alternative materials.

Rotatable top portion 14 has a generally hollow cylindrical shape with an open first end and a closed second end; however, this is not required. In one non-limiting embodiment, the dimensions of a rotatable top portion are about 1-3 inches height by about 1-4 inches diameter. However, it can be appreciated that the rotatable top portion can have many other types of shapes and dimensions. In non-limiting embodiments, the outer diameter of the rotatable top portion is selected such that it is less than the diameter of cavity 28 of housing portion 16; however, this is not required. Rotatable top portion 14 can include a cavity 35. The size and shape of the cavity is non-limiting. The opening of the cavity generally begins at coupling edge 36 and terminates prior to top edge 38; however, this is not required. In one non-limiting embodiment, the thickness t of the material of rotatable top portion 14 can be about 1-10; however, this is not required.

Located between the coupling edge 36 and top edge 38 of rotatable top portion 14, there is optionally provided one or more apertures 44 through which product can flow. In one non-limiting embodiment, aperture 44 is provided substantially parallel to the coupling and top edges in a position equidistant from the coupling edge and the top edge, and extends partially the circumference of the rotatable top portion 14; however, it can be appreciated that other distances can be used. In one non-limiting arrangement, the cross-sectional area of aperture 44 is the same or greater than the cross-sectional area of aperture 30 in the housing portion. In another non-limiting arrangement, aperture 44 has the same size and shape as aperture 30 in the housing portion. In another non-limiting embodiment, when the rotatable top portion is inserted into the housing portion, aperture 44 is positioned in the rotatable top portion and aperture 30 is positioned on the housing position such that the two aperture can at least partially or fully align with one another when the rotatable top portion is moved to a certain position relative to the housing portion during the operation of the closeable container cap 10.

Optionally disposed on the top surface 40 of rotatable top portion 14 is a handle 42 for rotating rotatable top portion 14 relative to the housing portion. The shape and dimensions of handle 42 are non-limiting. Optionally, handle 42 can be textured with a plurality of slip-resistant surface projections for the purpose of improving grip when wet. The textured pattern on the outer surface of the housing portion is non-limiting. As illustrated in FIGS. 4-6 and 8, the end of handle 42 can extend beyond the side edge of top portion 14 and housing portion 16; however, this is not required. Such a handle design can facilitate in the moving of the rotatable top portion between the open and closed positions.

As illustrated in FIGS. 5-6, housing portion 16, rotatable top portion 14, and dispensing lip portion 18 can be assembled to provide closeable container cap 10. In non-limiting embodiments, the diameter of housing portion 16 can be greater than the diameter of rotatable top portion 14 such that rotatable top portion 14 can be inserted into cavity 28 of housing portion 16; however, this is not required. As such, outer surface 32 of rotatable top portion 14 can optionally frictionally engage with inner surface 26 of housing portion 16; however, this is not required. As can be appreciated, other methods of engagement can be used for retaining the rotatable top portion within the housing portion. For example, a rib/groove system can be used wherein a rib disposed on the outer surface 32 of rotatable top portion 14 can engage with a groove disposed on the inner surface 26 of housing portion 16, or visa versa. In other non-limiting embodiments, the diameter of rotatable top portion 14 can be greater than the diameter of housing portion 16 such that cavity 35 of the rotatable top telescopically receives of housing portion 14 when assembled as closeable container cap 10; however, this is not required.

With continued reference to FIGS. 5-6, rotatable top portion 14 can be rotated between a closed position (FIG. 5) and a partially open position or fully open position. (FIG. 6).

Figure 7:
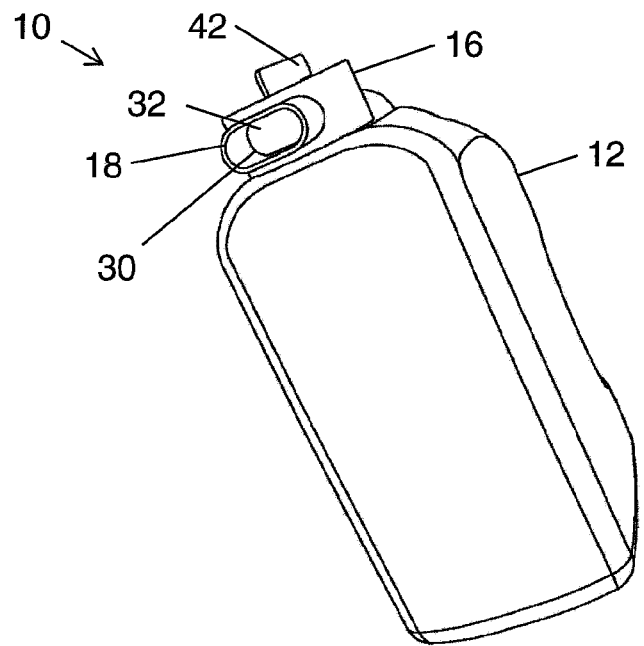
FIG. 7 is a perspective view of a closeable container cap of FIG. 5 attached to a container.

With reference now to FIG. 7, when closeable container cap 10 is attached to container 12 when the closeable container cap is in the closed position, the drum portion of rotatable top portion 14 blocks the aperture 30 of housing portion 16 (as seen by the outer surface 32 of rotatable top portion 16 in aperture 30 of housing portion 16). As such, when the container 12 is oriented horizontally, the product in container 12 is not permitted to flow through closeable container cap 10.

Figure 8:
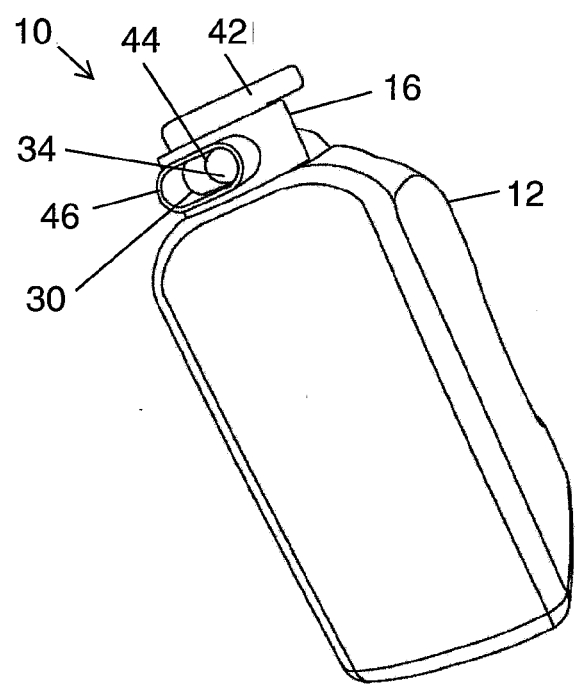
FIG. 8 is a perspective view of a closeable container cap of FIG. 6 attached to a container.

With reference now to FIG. 8, when closeable container cap 10 is attached to container 12 and the closeable container cap is in the open position, the aperture 44 of rotatable top portion 14 is aligned with the aperture 30 of housing portion 16, thereby defining a channel through which product will flow when the container 12 is oriented horizontally.

Referring now to FIGS. 9-13, a non-limiting retaining arrangement for securing rotatable top portion 14 to housing portion 16 to inhibit or prevent the rotatable top portion 14 of the container cap 10 from inadvertently separating from the housing portion 16 when the rotatable top portion 14 is moved between the open and closed positions, and also for limiting the degree of rotation of rotatable top portion 14 relative to housing portion 16 is illustrated.

Figure 10:
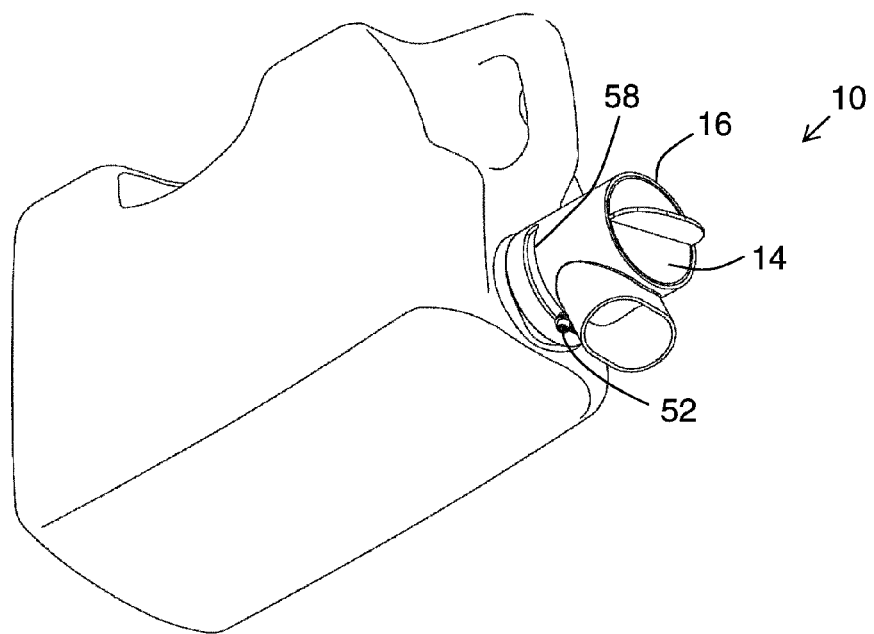
FIG. 10 is a side perspective view of a closeable container cap attached to a container of FIG. 9.

The retaining arrangement can be in the form of a slot and screw/pin arrangement that is positioned between the rotatable top portion and the housing portion; however, this is not required. As best illustrated in FIG. 10, a slot or opening 58 can be provided on housing 16 through which a screw attached to and extending outwardly from the rotatable top portion 14 can slide. In one non-limiting embodiment, slot 58 is provided substantially parallel to the coupling edge of housing 16 and extends only partially the circumference of the housing portion 16. The shape of slot 58 is generally elliptical shaped; however, this is not required. In some embodiments, the slot 58 extends about 20%-80% around the circumference of the housing position, and more particularly 20%-60% around the circumference of the housing position, and more particularly about 20-30% around the circumference of the housing portion. Slot 58 can limit the range or degree of movement of the rotatable top portion 14 relative to the housing 16; however, this is not required. As such, the range of rotational movement of the rotatable top portion relative to the housing portion can be limited by the distance or length of slot 58.

Figure 9:
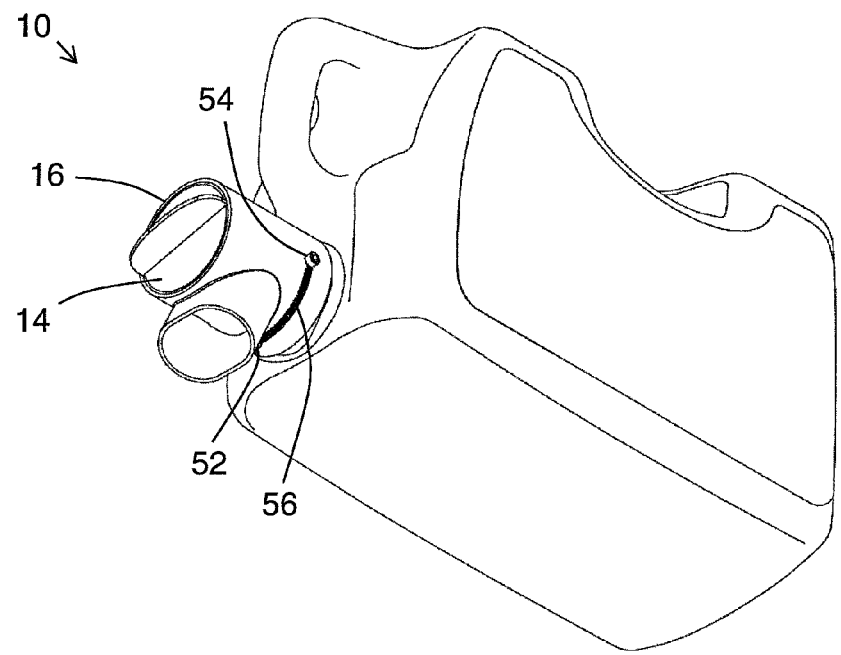
FIG. 9 is a front perspective view of a closeable container cap attached to a container according to another non-limiting aspect of the present invention.
Figure 11:
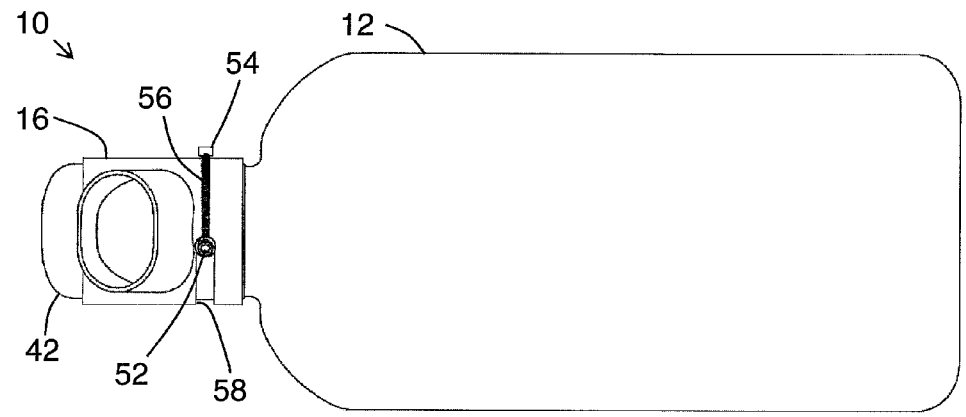
FIG. 11 is a side plan view of a closeable container cap attached to a container of FIG. 9.

Referring now to FIGS. 9 and 11-13, the retaining arrangement can optionally include a biasing arrangement that can be designed to bias the rotatable top portion 14 in the closed position; however, this is not required. In one non-limiting embodiment, the biasing arrangement can be in the form of a spring; however, this is not required. As illustrated in FIGS. 9 and 11, one end of a spring 56 is connected to the housing portion 16 by a pin, rivet or screw 54 being inserted into opening 64 of the housing portion. As can be appreciated, the spring can be connected to the housing portion by other or additional arrangements. The spring is illustrated as being connected to the outer surface of the housing portion; however, this is not required. The housing portion can include a spring groove or spring cavity (not shown) wherein the spring can be at least partially positioned therein and can be used to at least partially retain the position of the spring relative to the housing portion. The other end of spring 56 is connected to rotatable top portion 14 via pin device 60 (e.g., pin, bearing, rod, screw, nail, etc.). One end of pin device 60 is fitted through opening 62 in the rotatable top portion 14 and through slot 58 in the housing portion. Screw 52 secures the end of spring 52 to the end of the pin or bearing that is extending through slot 58. As can be appreciated, the body of the pin device can be integrally formed in the side wall of the rotatable top portion; however, this is not required. As also can be appreciated, the pin device and screw 52 can be a single component; however, this is not required. As can be appreciated; other or additional arrangements can be used to secure the spring to rotatable top portion 14.

In its compressed/relaxed state, spring 56 holds the spring connection points at the housing position and the rotatable top portion at a distance such that the closable container cap 10 remains in a closed position. As a user rotates the rotatable top portion relative to the housing portion to move the closable container cap to an open position, spring 56 is caused to stretch. When the user releases the handle on the rotatable top portion, the spring will cause the rotatable top portion to rotate back to the closed position.

The rotatable top portion 14 can be at least partially held in place within housing portion 16 by screw 52 which is connected to rod or bearing 60. Optionally, bearing 60 is a nylon bearing that can be used to reduce friction; however, this is not required. As can be appreciated, the bearing can be formed of other or alternative materials. When rotatable top portion 14 is rotated within housing 16, screw 52 slides in slot 58 provided in the housing 16. Thus, when rotatable top 14 is rotated fully clockwise or counterclockwise, screw 52 can travel as far as it can in slot 58 of housing 16; however, this is not required.

Figure 12:
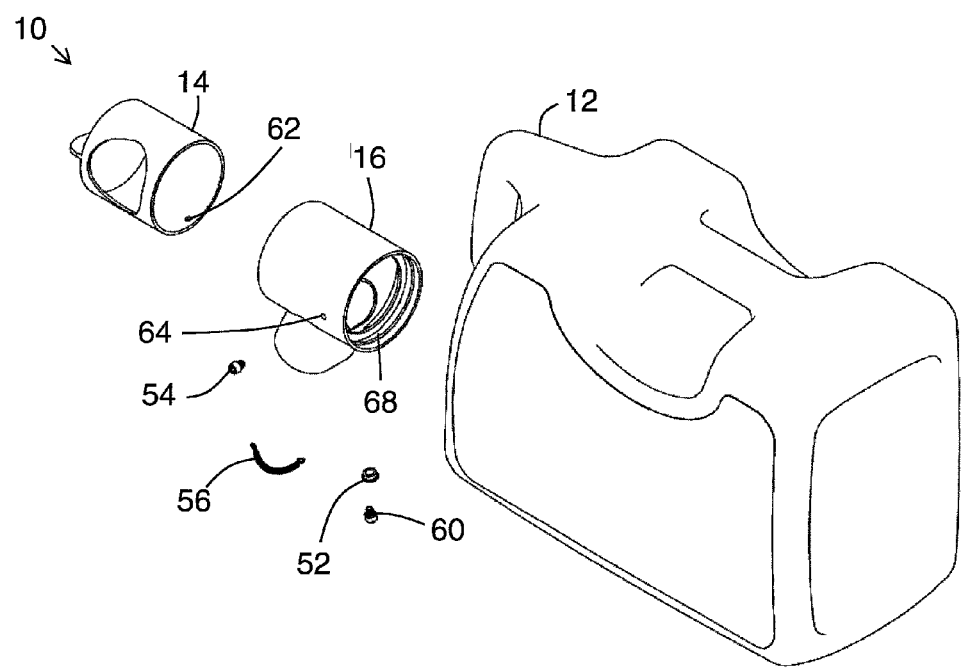
FIG. 12 is a side exploded view of a closeable container cap of FIG. 9.
Figure 13:
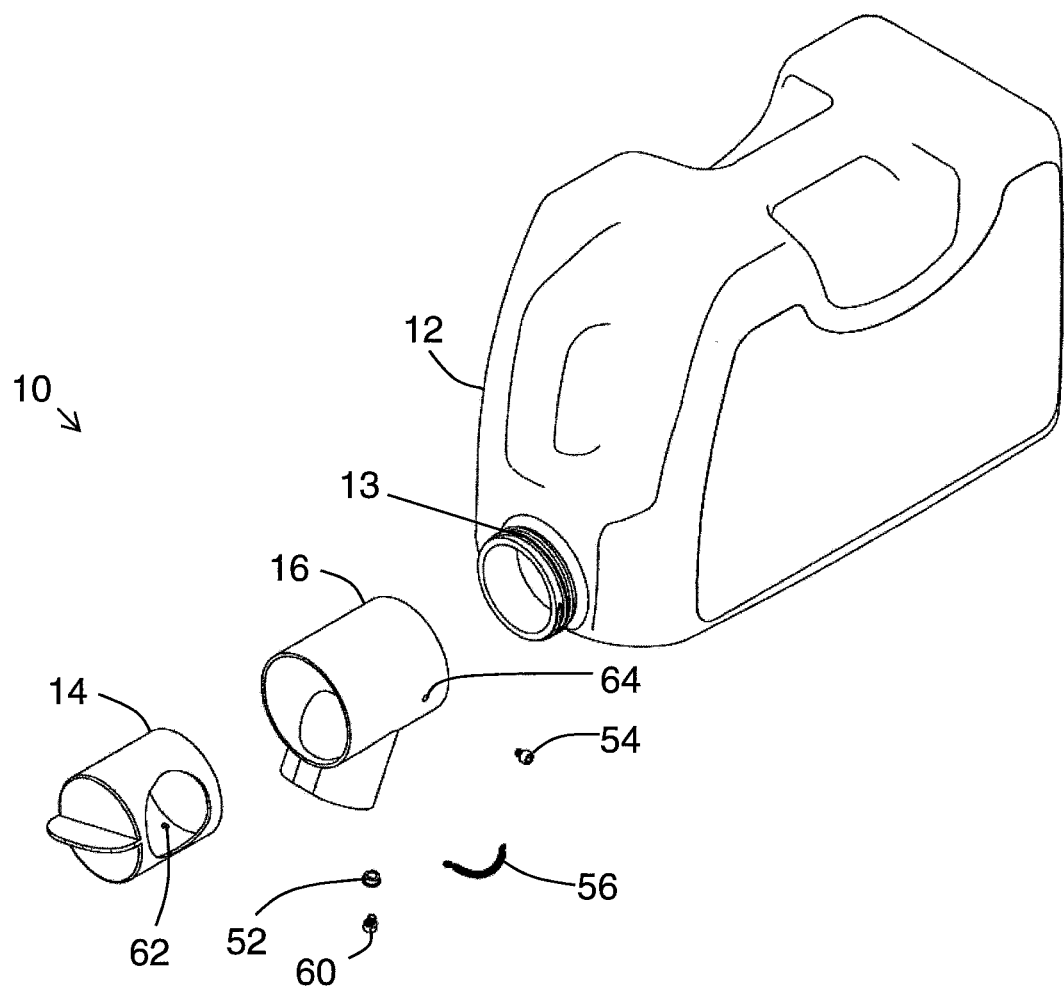
FIG. 13 is a front exploded view a closeable container cap of FIG. 9.

Referring now to FIGS. 12 and 13, there is illustrated the closeable container cap 10 that is designed to be screwed onto container 12. The housing portion 16 includes be internal threadings 68 to threadedly engage threadings 13 on the neck of container 12; however, this is not required.

In accordance with one non-limiting embodiment of the present invention, when closeable container cap 10 is properly attached to the top of a container, opening 11 in the neck of the container, the opening in the base of cavity 28 of the housing portion, the aperture 46 of dispensing lip 18, aperture 30 of housing portion 16, aperture 44 of rotatable top portion 14, the main body of rotatable top portion 14, and the main body of housing portion 16 creates a passageway for material in the container to flow from the container and out through the dispensing lip. As can be appreciated, other flow paths and arrangements can be used for the dispensing of products from the container through closeable container cap 10.

The components of the closeable container cap 10 according to one non-limiting embodiment of the present invention can be quickly and easily disassembled for cleaning; however, this is not required.

The invention has been described with reference to a number of different embodiments. It is to be understood that the invention is not limited to the exact details of construction, operation, exact materials or embodiments shown and described, as obvious modifications and equivalents will be apparent to one skilled in the art. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

The invention claimed is:

1. A closeable container cap comprising:
a housing portion configured to provide an attachment with a container, said housing portion having a housing side wall, said housing portion including a housing cavity extending the full length of said housing portion, said housing cavity having a generally circular cross-sectional shape, said housing side wall including a housing aperture and a dispensing lip, said housing aperture spaced between a lower end and an upper end of said housing side wall, said dispensing lip including an aperture cavity that is aligned with said housing aperture to enable materials that flow out of said housing aperture to flow into one end of said aperture cavity and to exit an opposite end of said aperture cavity, said dispensing lip extending outwardly from an outer surface of said housing side wall, a bottom portion of an inner wall of said housing cavity including a threaded portion configured to releasably connect to the container, said inner wall of said housing cavity including a rotation limit slot, at least a portion of said rotation limit slot positioned between said lower end of said housing side wall and said housing aperture; and,
a rotatable top portion configured to controllably dispense contents from the container when said closeable container cap is connected to the container, said rotatable top portion including a top portion side wall and a top wall and a retainer arrangement, said rotatable top portion including a top portion cavity having an opening in a base of said rotatable top portion and which top portion cavity terminates at a bottom side of said top wall, a top surface of said top wall including a handle that extends upwardly from said top surface, said outer surface of said top portion side wall having a generally circular cross-sectional shape, a diameter of said outer surface of said top portion side wall is less than a diameter of said housing cavity such that said rotatable top portion can be at least partially positioned in said housing cavity and be at least partially rotated in said housing cavity and about a central longitudinal axis of said housing cavity between an open position and a closed position, said top portion side wall including a top portion aperture, said top portion aperture at least partially aligning with said housing aperture when said rotatable top portion is rotated to said open position, said top portion aperture unaligned with said housing aperture when said rotatable top portion is rotated to said closed position, said retainer arrangement connected to an outer surface of said top portion side wall and at least partially positioned in said rotation limit slot of said housing portion when said rotatable top portion is positioned in said housing cavity, said retainer arrangement and said rotation limit slot configured to prevent said rotatable top portion from removing from said housing cavity as said rotatable top portion is rotated in said housing cavity between said open and closed position, said retainer arrangement and said rotation limit slot configured limit an amount of rotation of said rotatable top portion about said central longitudinal axis of said housing cavity.

2. The closeable container cap as defined in claim 1, wherein a size and shape of said top portion aperture and said housing aperture are the same, said top portion aperture fully aligned with said housing aperture when said rotatable top portion is rotated to said fully open position.

3. The closeable container cap as defined in claim 1, wherein said dispensing lip extending at an upward angle from said housing side wall.

4. The closeable container cap as defined in claim 2, wherein said dispensing lip extends at an upward angle from said housing side wall.

5. The closeable container cap as defined in claim 1, wherein a portion of said handle extends beyond an outer perimeter of said housing side wall.

6. The closeable container cap as defined in claim 4, wherein a portion of said handle extends beyond an outer perimeter of said housing side wall.

7. The closeable container cap as defined in claim 1, wherein said retaining arrangement includes a pin arrangement that is configured to at least partially extend into said rotation limit slot of said housing portion when said rotatable top portion is positioned in said housing cavity.

8. The closeable container cap as defined in claim 4, wherein said retaining arrangement includes a pin arrangement that is configured to at least partially extend into said rotation limit slot of said housing portion when said rotatable top portion is positioned in said housing cavity.

9. The closeable container cap as defined in claim 1, wherein said rotation limit slot extends about 10-80% around a circumference of said housing side wall of said housing portion.

10. The closeable container cap as defined in claim 1, further including a biasing arrangement that is connected to said housing portion and said rotatable top portion, said biasing arrangement configured to bias said rotatable top portion in said closed position.

11. The closeable container cap as defined in claim 10, wherein said biasing arrangement includes a spring, one end portion of said spring is connected to said side wall of said housing position and an opposite end portion of said spring is connected to said rotatable top portion.

12. The closeable container cap as defined in claim 11, wherein said opposite end portion of said spring is connected to said pin arrangement on said rotatable top portion.

13. A method for controllable dispensing a material from a container comprising:
providing a container, said container including an opening that provides access to material in a cavity of said container, said container including threading about said opening;
providing a closeable container cap, said closeable container cap including:
a housing portion configured to provide an attachment with a container, said housing portion having a housing side wall, said housing portion including a housing cavity extending the full length of said housing portion, said housing cavity having a generally circular cross-sectional shape, said housing side wall including a housing aperture and a dispensing lip, said housing aperture spaced between a lower end and an upper end of said housing side wall, said dispensing lip including an aperture cavity that is aligned with said housing aperture to enable materials that flow out of said housing aperture to flow into one end of said aperture cavity and to exit an opposite end of said aperture cavity, said dispensing lip extending outwardly from an outer surface of said housing side wall, a bottom portion of an inner wall of said housing cavity including a threaded portion configured to releasably connect to the container, said inner wall of said housing cavity including a rotation limit slot, at least a portion of said rotation limit slot positioned between said lower end of said housing side wall and said housing aperture; and,
a rotatable top portion configured to controllably dispense contents from the container when said closeable container cap is connected to the container, said rotatable top portion including a top portion side wall and a top wall and a retainer arrangement, said rotatable top portion including a top portion cavity having an opening in a base of said rotatable top portion and which top portion cavity terminates at a bottom side of said top wall, a top surface of said top wall including a handle that extends upwardly from said top surface, said outer surface of said top portion side wall having a generally circular cross-sectional shape, a diameter of said outer surface of said top portion side wall is less than a diameter of said housing cavity such that said rotatable top portion can be at least partially positioned in said housing cavity and be at least partially rotated in said housing cavity and about a central longitudinal axis of said housing cavity between an open position and a closed position, said top portion side wall including a top portion aperture, said top portion aperture at least partially aligning with said housing aperture when said rotatable top portion is rotated to said open position, said top portion aperture unaligned with said housing aperture when said rotatable top portion is rotated to said closed position, said retainer arrangement connected to an outer surface of said top portion side wall and at least partially positioned in said rotation limit slot of said housing portion when said rotatable top portion is positioned in said housing cavity, said retainer arrangement and said rotation limit slot configured to prevent said rotatable top portion from removing from said housing cavity as said rotatable top portion is rotated in said housing cavity between said open and closed position, said retainer arrangement and said rotation limit slot configured limit an amount of rotation of said rotatable top portion about said central longitudinal axis of said housing cavity; and, rotating said rotatable top portion relative to said housing portion by use of said handle on said rotatable top portion from said closed position to said open position while said closeable container cap is connected to said container and positioned over said opening of said container to thereby allow materials in said cavity of said container to flow through said opening of said container and into said closeable container cap and then through said top portion aperture and said housing aperture.

14. The method as defined in claim 13, including the step of securing said closeable container cap to said container.

15. The method as defined in claim 13, wherein said rotation limit slot extends about 10-80% around a circumference of said housing side wall of said housing portion.

16. The method as defined in claim 14, wherein said rotation limit slot extends about 10-80% around a circumference of said housing side wall of said housing portion.

17. The method as defined in claim 15, wherein said retaining arrangement includes a biasing arrangement to bias said rotatable top portion in said closed position.

18. The method as defined in claim 17, wherein said biasing arrangement includes a spring, one end portion of said spring is connected to said side wall of said housing position and an opposite end portion of said spring is connected to said rotatable top portion.

19. The method as defined in claim 16, wherein said retaining arrangement includes a biasing arrangement to bias said rotatable top portion in said closed position.

20. The method as defined in claim 19, wherein said biasing arrangement includes a spring, one end portion of said spring is connected to said side wall of said housing position and an opposite end portion of said spring is connected to said rotatable top portion.

21. The closeable container cap as defined in claim 20, wherein said rotation limit slot extends about 10-80% around a circumference of said housing side wall of said housing portion.

22. The closeable container cap as defined in claim 21, further including a biasing arrangement that is connected to said housing portion and said rotatable top portion, said biasing arrangement configured to bias said rotatable top portion in said closed position.

23. The closeable container cap as defined in claim 22, wherein said biasing arrangement includes a spring, one end portion of said spring is connected to said side wall of said housing position and an opposite end portion of said spring is connected to said rotatable top portion.

24. The closeable container cap as defined in claim 23, wherein said opposite end portion of said spring is connected to said pin arrangement on said rotatable top portion.

* * * * *